United States Patent [19]

Sado

[11] Patent Number: 4,803,463
[45] Date of Patent: Feb. 7, 1989

[54] KEY INPUT MEANS WITH CHANGEABLE DISPLAY MEANS FOR DISPLAYING KEY FUNCTIONS

[75] Inventor: Ichiro Sado, Yokohama, Japan

[73] Assignee: Canon Kabushiki Kaisha, Tokyo, Japan

[21] Appl. No.: 942,920

[22] Filed: Dec. 17, 1986

Related U.S. Application Data

[63] Continuation of Ser. No. 532,145, Sep. 14, 1983, abandoned.

[30] Foreign Application Priority Data

Sep. 21, 1982 [JP] Japan .................. 57-163096

[51] Int. Cl.[4] ................................. G06F 3/02
[52] U.S. Cl. ................................. 341/23; 340/712; 364/709.14
[58] Field of Search .......... 340/711, 712, 365 VL, 340/365 S, 365 R, 365 C, 716; 364/189, 709, 706, 900; 200/314

[56] References Cited

U.S. PATENT DOCUMENTS

| | | | |
|---|---|---|---|
| 3,831,081 | 8/1974 | Weiss | 340/365 E |
| 3,956,745 | 5/1976 | Ellis | 340/365 VL |
| 4,017,848 | 4/1977 | Tannas, Jr. | 340/365 VL |
| 4,078,257 | 3/1978 | Bagley | 340/365 VL |
| 4,279,021 | 7/1981 | See et al. | 340/365 VL |
| 4,313,108 | 1/1982 | Yoshida | 340/365 VL |
| 4,336,530 | 6/1982 | Koike et al. | 340/365 VL |
| 4,385,366 | 5/1983 | Housey, Jr. | 340/365 VL |
| 4,523,298 | 6/1985 | Sakurai | 340/365 S |
| 4,558,191 | 4/1986 | Burgeth et al. | 364/709 |
| 4,561,002 | 12/1985 | Chiu | 340/365 C |
| 4,670,853 | 6/1987 | Stepien | 364/709 |

*Primary Examiner*—Joseph A. Orsino
*Assistant Examiner*—Brent A. Swarthout
*Attorney, Agent, or Firm*—Fitzpatrick Cella Harper & Scinto

[57] ABSTRACT

An input device comprises key input means having a plurality of keys, specifying means for specifying functions of the plurality of keys of the key input means and display means for displaying key denominations representing the key functions specified by the specifying means. The key input means includes a transparent keyboard arranged on the display means.

5 Claims, 5 Drawing Sheets

KEY INPUT MEANS WITH CHANGEABLE DISPLAY MEANS FOR DISPLAYING KEY FUNCTIONS

This application is a continuation of application Ser. No. 532,145, filed Sept. 14, 1983, now abandoned.

BACKGROUND OF THE INVENTION

1. Field of the Invention

The present invention relates to an input device which displays a key denomination representing a key function.

2. Description of the Prior Art

In the prior art device, denominations of key switches of a keyboard are indicated by engraving or sheets bearing the denominations. In such a device, the denominations of the key switches are fixed and the alternation of the denominations are very difficult. The denominations are always indicated and a special arrangement such as an illumination type key switch is required to indicate a key permitted for entry.

SUMMARY OF THE INVENTION

It is an object of the present invention to provide an input device having means for specifying a key function and display means for displaying a denomination of the key specified by the specifying means.

It is another object of the present invention to provide an input device comprising key input means having a plurality of keys, specifying means for specifying functions of the plurality of keys of the key input means, and display means for displaying denominations representing the key functions specified by the specifying means.

It is still another object of the present invention to provide an input device comprising key input means having a plurality of keys, memory means containing a plurality of key denominations representing functions of the plurality of keys of the key input means, specifying means for specifying functions of the plurality of keys of the key input means, control means for selecting the key functions specified by the specifying means and reading out key denominations representing the key function from the memory means, and display means for displaying the key denominations representing the key functions read from the memory means.

It is a further object of the present invention to provide an input device comprising key input means having a plurality of keys, specifying means for specifying functions of the plurality of keys by depressing one of the plurality of keys of the key input means, and display means provided one for each of the plurality of keys for displaying key denominations representing the key functions specified by the specifying means for the respective ones of the plurality of keys of the key input means.

The other objects of the present invention will be apparent from the following detailed description of the preferred embodiments.

DETAILED DESCRIPTION OF THE PREFERRED EMBODIMENTS

Figure 1:
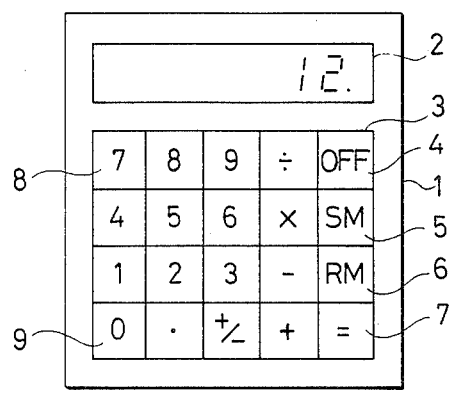
FIG. 1 shows key switches used to specify key functions in accordance with one embodiment of the present invention.
Figure 2:
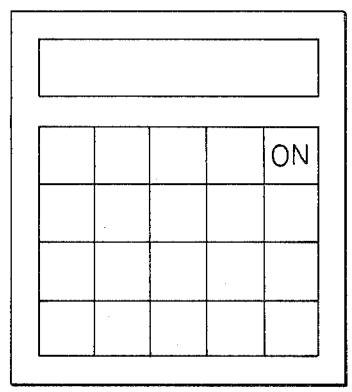
FIG. 2 shows specifying means for input keys in accordance with the present embodiment.

FIGS. 1 and 2 show key switches of a desk-top calculator to which the present invention is applied. A display 2 is a segment type or dot matrix type display for displaying input data or an operation result. A key switch unit 3 comprises a transparent keyboard arranged on the dot matrix display 2 for displaying the input data. Before a function of the desk-top calculator is specified, only ON/OFF key 4 of the key switch unit 3 is displayed as "ON" and denominations of other keys are not displayed. When the "ON" key 4 is depressed, the key functions of the desk-top calculator are specified and the key denominations representing the key functions are displayed.

For example, the key switch denominations are displayed as shown in FIG. 1 and the key switches having their denominations displayed are allowed for entry.

Figure 3:
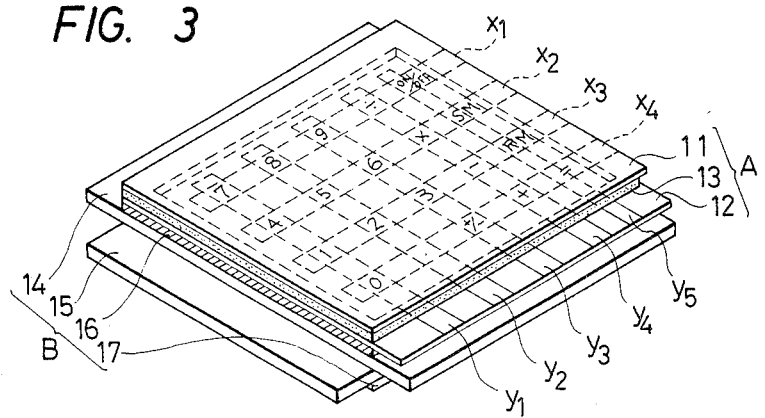
FIG. 3 shows a perspective view of a construction of a keyboard unit.

A detailed structure of the key switch unit is shown in FIG. 3, in which $\underline{B}$ denotes a liquid crystal display which comprises an upper glass 14 having a transparent electrode pattern x (not shown) formed thereon, a lower glass 15 having a transparent electrode pattern y (not shown) formed thereon, an upper polarization plate 16 and a reflecting plate 17 with a polarization plate. A liquid crystal is interposed between the upper glass plate 14 and the lower glass plate 15 to form a reflection type liquid crystal display. $\underline{A}$ denotes a transparent keyboard. Transparent electrodes $x_1$–$x_4$ are arranged on an upper transparent film 11 to allow key entry. Numeral 12 denotes a lower transparent film having transparent electrodes $y_1$–$y_5$ arranged thereon to allow key entry. Numeral 13 denotes a spacer for defining a small spacing between the upper transparent film 11 and the lower transparent film 12. The upper transparent film 11 and the lower transparent film 12 are bonded to the spacer 13 to form the transparent keyboard A. The keyboard A and the liquid crystal display B are bonded in union on the lower surface of the lower transparent film 12 and the upper surface of the upper polarization plate 16.

In the key switch unit, the key denominations representing the key functions are displayed on the liquid crystal display B, and an operator depresses a desired key switch of the transparent keyboard A while watching the display to enter key data.

The denominations may be displayed on a CRT instead of the keyboard unit and the data may be entered by a light pen instead of keys without departing from the spirit of the invention.

Figure 4:
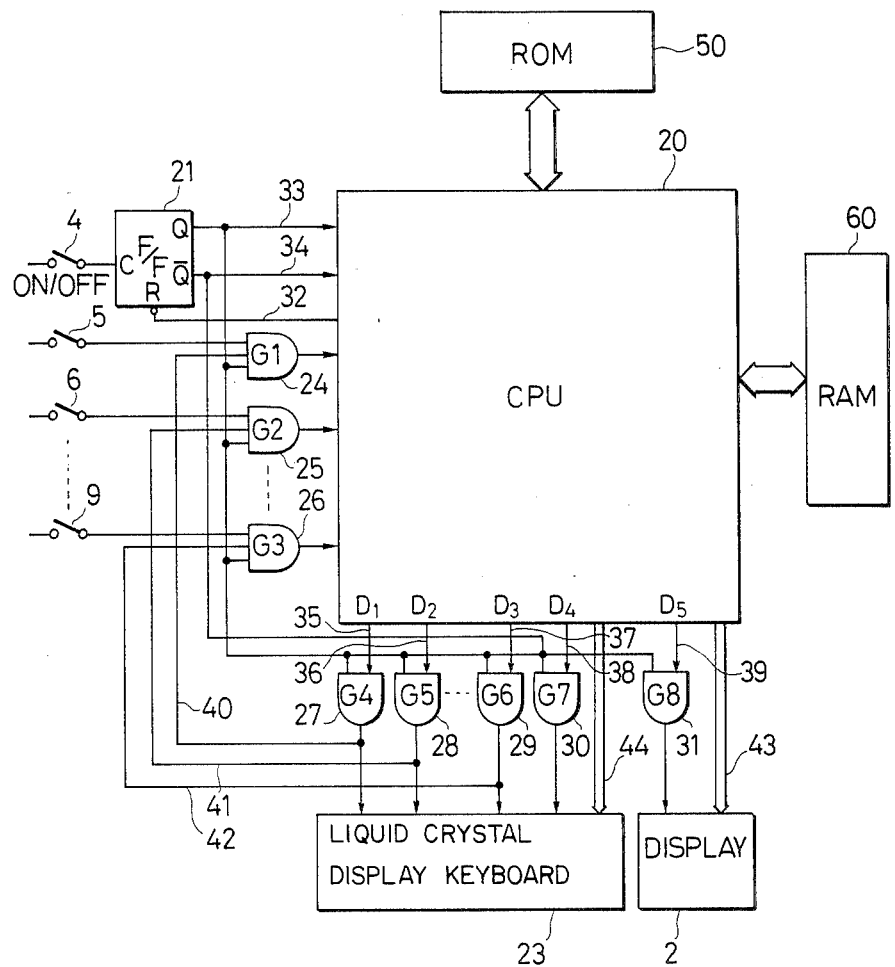
FIG. 4 shows a block diagram of the present embodiment.

FIG. 4 shows a block diagram of the input device of the present embodiment. Numeral 20 denotes a microprocessor (CPU) which performs arithmetic and logical operations, numeral 50 denotes a control memory in a form of a read-only memory (ROM) which stores control procedures for the CPU 20. The ROM 50 also stores the key denominations to be displayed on the liquid crystal display B. Numeral 60 denotes a random access memory (RAM) to temporarily store various data. F/F 21 denotes a flip-flop which is initially reset by a reset signal 32 from the CPU 20 and it is thereafter repeatedly set and reset by the depression of the ON/OFF key 4. An output Q33 of the F/F 21 produces a logical "1" output when the F/F 21 is set and an output $\overline{Q}$ 34 produces a logical "1" output when the F/F 21 is reset. G1 24–G3 26 denote gates which control input of the key information of the key switches to the CPU 20 by input enable signals 40-42 from the CPU 20, D1 35–D3 37 denote output terminals which produce key denomination display enable signals for displaying the key denominations of the key switches of the keyboard 3 as shown in FIG. 1, and G4 27–G6 29 denote gates for displaying the key denominations on the liquid crystal display 23 on the key unit 3 when the Q33 signal is "1" and the key denomination display enable signal is present. D4 38 denotes an output terminal which produces an "ON" display enable signal for displaying "ON" on the ON/OFF key 4 as shown in FIG. 2. When the $\overline{Q}34$ signal is "1" a gate G7 30 is satisfied and the liquid crystal display 23 displays "ON".

D5 39 denotes an output terminal which produces a display enable signal for displaying an operation result on a display 2. When the Q33 signal is "1", a gate G8 31 is satisfied and the display 2 displays the operation result. Numeral 43 denotes a signal line to supply display information to the display 2, and numeral 44 denotes a signal line to supply display information to the liquid crystal display 23.

While the denominations of all of the key switches are displayed in FIG. 1, the denominations of only desired key switches can be displayed by controlling the D1 35–D3 37 signals by the CPU 20. The operation of the CPU 20 is now explained with reference to a flow chart of FIG. 5.

In a step S1, a power is turned on, the CPU 20 produces the reset signal 32 and the F/F 21 is initially reset. In a step S2, the CPU 20 determines if the $\overline{Q}$ output of the F/F 21 is logical "1" or not. If it is logical "1", the CPU 20 produces the display enable signal at the output terminal D4, in a step S7, to display "ON" on the key unit as shown in FIG. 2. Since the $\overline{Q}$ output of the F/F 21 is logical "1" at this time, the display enable signal is supplied to the liquid crystal display 23 through the gate G7. The CPU 20 reads out the display data to display "ON" from the ROM 50 and the display data is supplied to the liquid crystal display 23 through the signal line 44. Thus, the key denomination "ON" is displayed on the key unit as shown in FIG. 2.

If the ON/OFF key 4 is depressed in the step S2, the F/F 21 is set and the Q output thereof assumes the logical "1". Thus, the CPU 20 determines that the $\overline{Q}$ output is not logical "1" and goes to the next step. In a step S3, the CPU 20 produces the key denomination display enable signal at the output terminal D4 to display the key denomination "OFF" at the position of the key unit at which "ON" has been displayed. Since the Q output of the F/F 21 is logical "1" at this time, the key denomination display enable signal is supplied to the liquid crystal display 23 through the gate G7. The CPU 20 reads out the display data for the key denomination "OFF" from the ROM 50 and the data is supplied to the liquid crystal display 23. Thus, the key denomination "OFF" is displayed on the key unit as shown in FIG. 1.

Figure 6A:
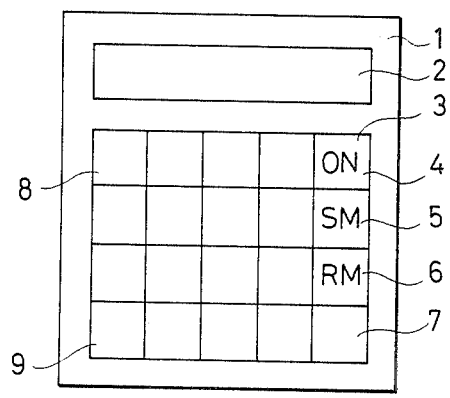
FIG. 6A shows specifying means for input keys in accordance with other embodiment.
Figure 6B:
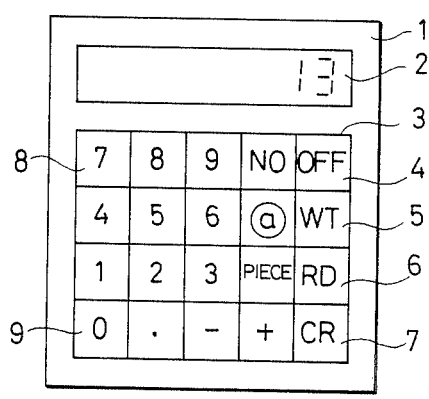
FIGS. 6B and 6C show key switches used to specify key functions in accordance with the other embodiment.
Figure 6C:
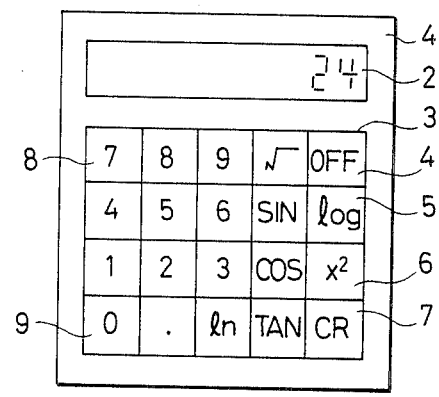
Figure 7:
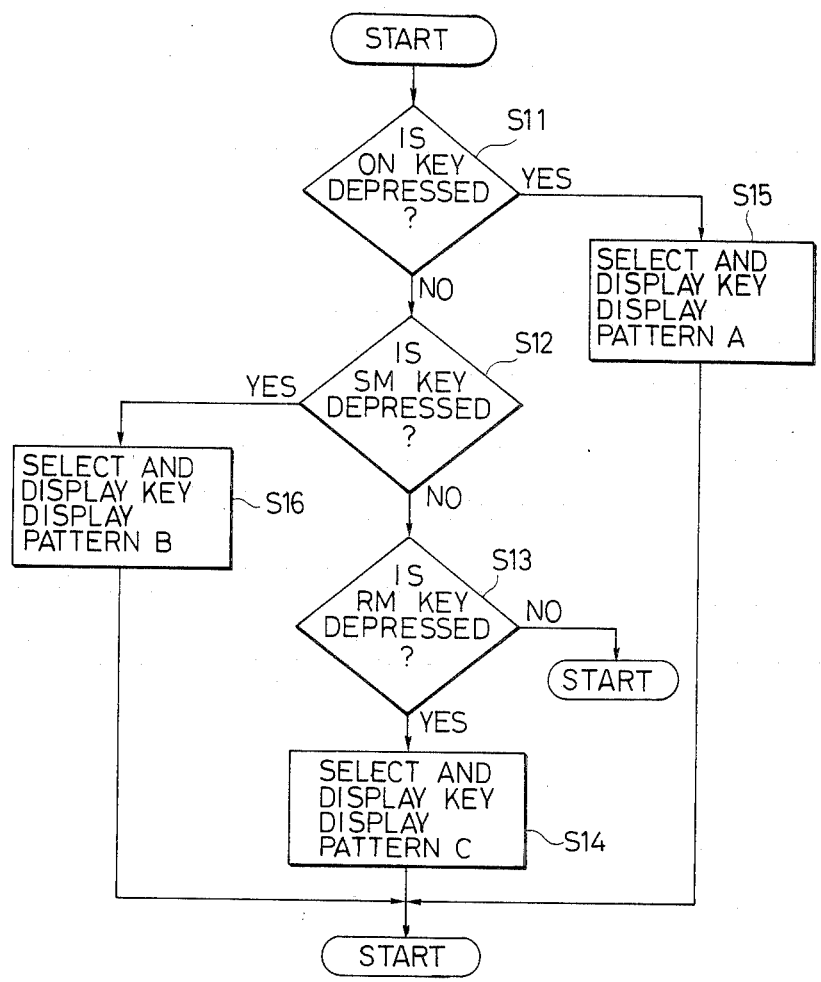
FIG. 7 shows a flow chart of a control operation when an input key is specified by the specifying means.

FIG. 6 shows another embodiment in which not only the ON/OFF key 4 but also an SM key 5 and an RM key 6 are displayed as the key function specifying keys so that the key switch denominations are selectively displayed as the respective keys are depressed. A control flow chart therefore is shown in FIG. 7. FIG. 6A shows the key denominations displayed on the key switch unit 3 before the key functions of the desk-top calculator are specified. FIG. 6B shows the key denominations displayed on the key switch unit 3 when the SM key 5 is depressed as the key function specifying key, and FIG. 6C shows the key denominations displayed on the key switch unit 3 when the RM key 6 is depressed as the key function specifying key. The key denominations displayed on the key switch unit 3 when the ON/OFF key 4 is depressed are shown in FIG. 1. In the present embodiment, the ROM 50 shown in FIG. 4 stores the key denomination display pattern A as shown in FIG. 1, a key denomination display pattern B as shown in FIG. 6B and a key denomination display pattern C as shown in FIG. 6C.

Figure 5:
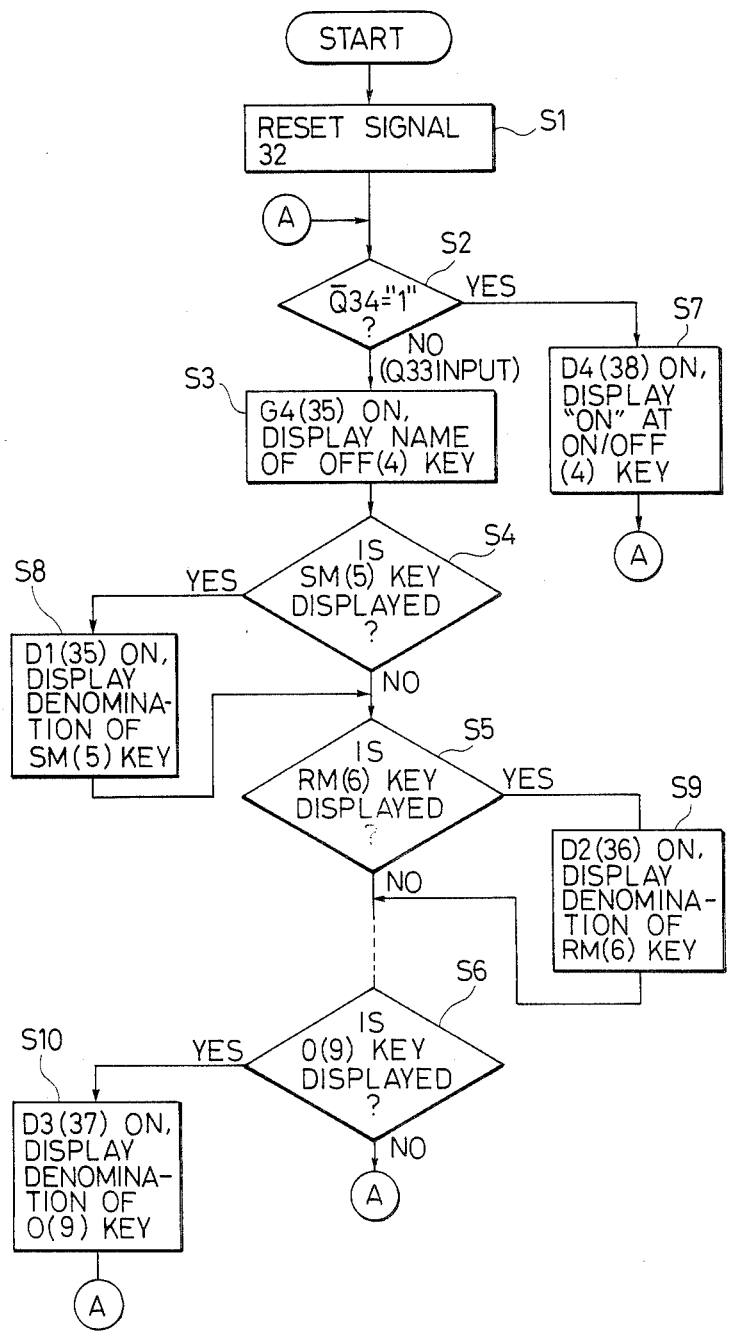
FIG. 5 shows a flow chart of a control operation of a control unit.

Under this condition, when an operator depresses the key switch 4, the CPU 20 determines in a step S11 that the depressed key is the "ON" key and selects, in a step S15, the key denomination display pattern A stored in the RAM 50, and the CPU 20 carries out the same operation as shown in FIG. 5 so that the key denomination is displayed as shown in FIG. 1. If the operator depresses the key switch 5, the CPU 20 determines in a step S12 that the depressed key is the SM key and selects, in a step S16, the key denomination display pattern B stored in the ROM 50 and the CPU 20 thereafter carries out the same operation as shown in FIG. 5 so that the key denominations shown in FIG. 6B are displayed. If the operator depresses the key switch 6, the CPU 20 determines in a step S13 that the depressed key switch is the RM key and selects, in a step S14, the key denomination display pattern C stored in the ROM 50 and the CPU 20 thereafter carries o... the same operation as shown in FIG. 5 so that the key denominations shown in FIG. 6C are displayed.

As described hereinabove, in accordance with the present invention, the key denominations for the key functions specified by the specifying means are displayed so that the key denominations are displayed with optimum arrangement and combination to the intended input system. As a result, the keyboard can be used as if it were designed for a special purpose with a small number of keys, and the possibility of misentry is reduced and an improved input teaching function is attained with a simple construction.

What I claim is:

1. An electronic apparatus comprising:
    a plurality of first key means for designating power ON of a power source;
    a plurality of second key means for inputting data;
    display means responsive to the operation of said first key means for displaying a definition of each key of said first key means and said second key means on each key of said first and second key means; and
    control means for controlling said display means to display on one of said first key means that said one is a key for designating power OFF of the power source.

2. An electronic apparatus according to claim 1, further comprising calculation means for effecting calculation in accordance with input data defined by said first key means and said second key means and second display means for displaying a result of the calculation by said calculation means.

3. An electronic apparatus according to claim 1, wherein said first key means includes a key for designating a definition of each key of said second key means.

4. An electronic apparatus according to claim 1, wherein said display means is a liquid crystal display.

5. An electronic apparatus according to claim 1, wherein said first key means and said second key means are transparent keyboards, respectively.

* * * * *